United States Patent

[11] 3,604,513

[72] Inventor  Frank Tassone
             Box 10, Gol Gol 2739, New South Wales, Australia
[21] Appl. No. 862,387
[22] Filed     Sept. 30, 1969
[45] Patented  Sept. 14, 1971

[54] CULTIVATING IMPLEMENT HYDRAULIC CONTROL MEANS
     5 Claims, 8 Drawing Figs.
[52] U.S. Cl. .................................................. 172/5,
                    91/434, 172/667, 172/59, 172/233
[51] Int. Cl. ........................................... A01b 13/06,
                                                    A01b 65/00
[50] Field of Search ............................ 172/233,
             234, 235, 2, 9, 7, 5, 6, 168, 169, 36, 38, 59, 645,
             647, 667, 663, 613; 91/431, 47, 434

[56]                References Cited
                 UNITED STATES PATENTS
2,243,364   5/1941   Trautman ................... 91/434
2,608,146   8/1952   Lund ........................... 172/667
2,769,382   11/1956  Vacek .......................... 172/59
3,005,499   10/1961  Marindin ..................... 172/7
3,171,496   3/1965   Nelson ........................ 172/9
3,177,950   4/1965   Lairam ........................ 172/233
3,213,605   10/1965  Welden ....................... 91/431
3,369,612   2/1968   Laikam ........................ 172/5

Primary Examiner—Robert E. Pulfrey
Assistant Examiner—C. W. Hanor
Attorney—Ward, McElhannon, Brooks & Fitzpatrick ABSTRACT: A tractor-mounted soil-cultivating implement of the type in which a cultivating element is movable from a retracted or nonworking position to a working position by operation of an hydraulic ram. The ram is supplied with hydraulic fluid from hydraulic system of the tractor via free flow control valve. In order to pressurize ram, the control valve must be held closed against pressure of hydraulic fluid so that operator feels increases in pressure due to obstacles struck by cultivating element.

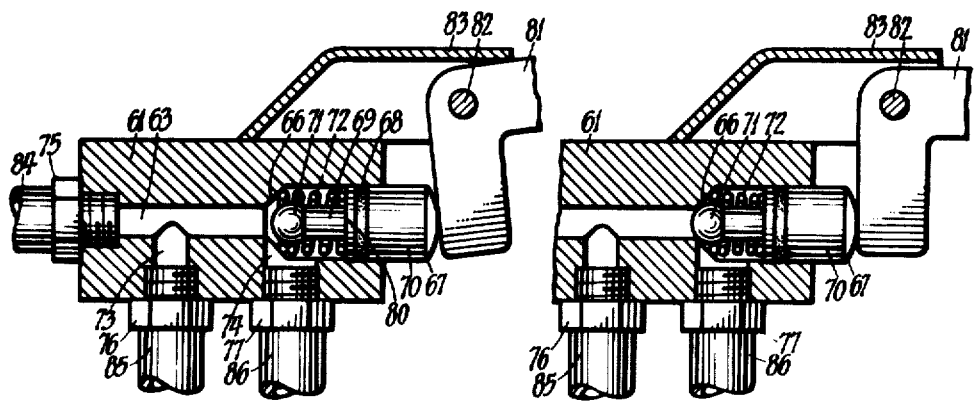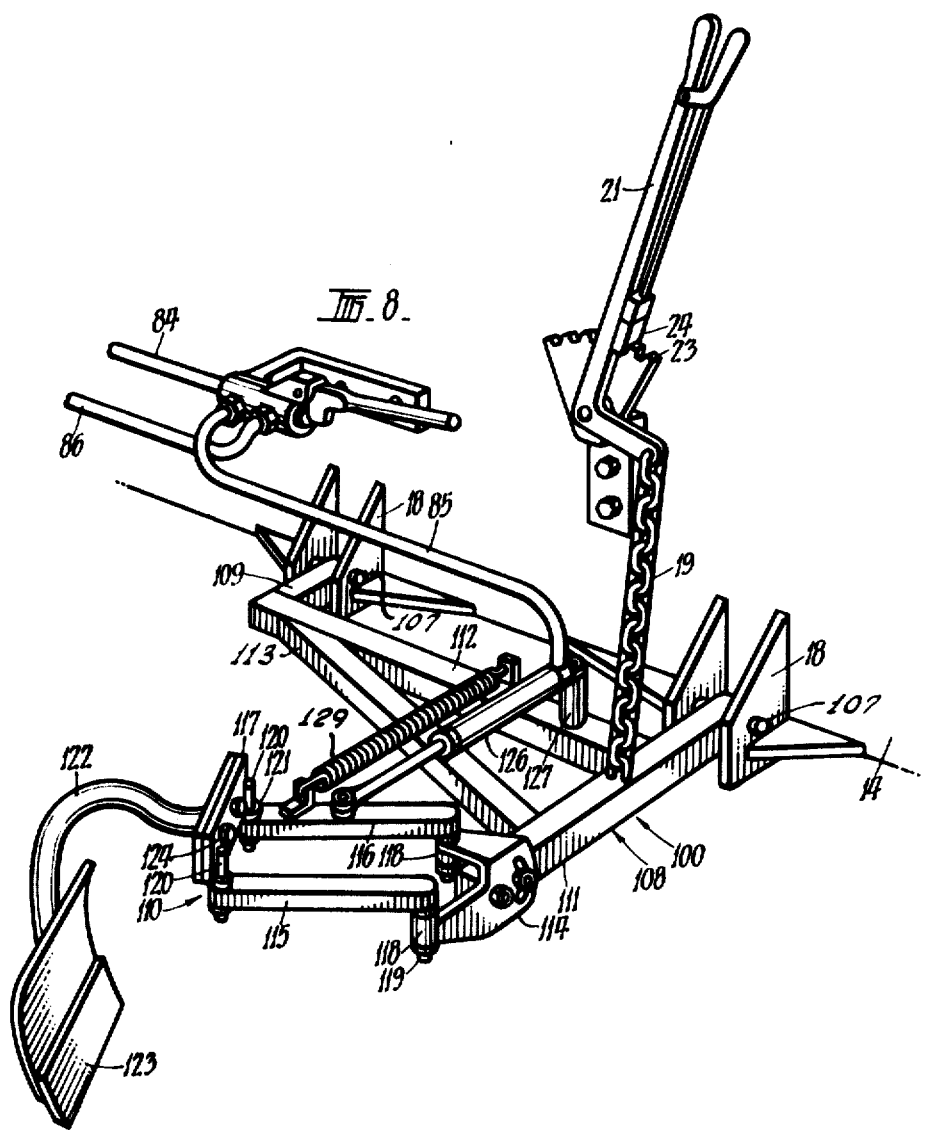

CULTIVATING IMPLEMENT HYDRAULIC CONTROL MEANS

BACKGROUND OF THE INVENTION

1. Field of the Invention

This invention relates to soil-cultivating implements and especially to implements which may be attached to a tractor for cultivation of the soil closely adjacent to the roots of vines, vegetables, shrubs and the like planted in rows.

2. Description of the Prior Art

There are various known types of tractor mountable cultivating implements fitted with cultivating elements which can be moved from cultivating positions to retracted positions in order to cultivate around obstacles in the path of the implement or to clear obstacles which may be struck by the cultivating element. Usually the cultivating element is held in its working position by operation of a hydraulic ram. The ram must, of course, be quite sturdy and must generate an effectively large holding force on the cultivating element and if the cultivating element should happen to strike a large obstruction whilst it is being held by the ram in its working position, considerable damage can be done to the implement. With the known arrangements, the operator must rely on visual observation of the implement and the ground ahead of it in order to know when to retract the cultivating element. Thus the operation of the known implements requires considerable skill and continuous concentration on the part of the operator. The present invention provides an improved arrangement which enables the operator to maintain a much more sensitive control of the implement and greatly reduces the danger of damage to the implement.

SUMMARY OF THE INVENTION

In essence the present invention provides for control of the hydraulic ram through a sensitive, free flow control valve. The control valve has a valve chamber into which there is a single inlet and from which there are two outlets. Hydraulic fluid is supplied to the chamber, via the inlet, from the hydraulic system of the tractor and one of the outlets is connected for continuous communication with the ram. The second outlet from the chamber is connected back to the reservoir of the hydraulic system and a valve member is movable to close second outlet.

When the second outlet is open hydraulic fluid can recirculate via this outlet back to the reservoir so that the fluid is not pressurized and the ram is inoperable. However, when the second outlet is closed by the valve member recirculation of the hydraulic fluid is prevented and the ram is pressurized so as to operate. The valve member is moved by manual control and must be held against the pressure of the hydraulic fluid so that the operator can feel rises in the pressure of the hydraulic fluid which occur when the cultivating element strikes obstructions.

In addition to providing sensitive control means which can be used with many implements of the type wherein cultivating elements are held in working positions by the operation of hydraulic rams, the invention further provides a novel form of implement of the latter type.

BRIEF DESCRIPTION OF THE DRAWINGS

The accompanying drawings, which illustrate two particular embodiments of the invention, are as follows:

FIG. 6 is a cross section through a hydraulic control valve for controlling the operation of an hydraulic ram incorporated in the implement and shows the condition of the valve when the implement is in the condition of FIG. 2;

FIG. 7 is a further cross section taken through part of the control valve to show the condition of the valve when the implement is in the condition of FIG. 3; and FIG. 8 is a perspective view of a second form of implement which is mounted on the tractor in place of the implement of FIGS. 1 to 7 and which is also constructed and arranged in accordance with the present invention.

DESCRIPTION OF THE PREFERRED EMBODIMENTS

Figure 1:
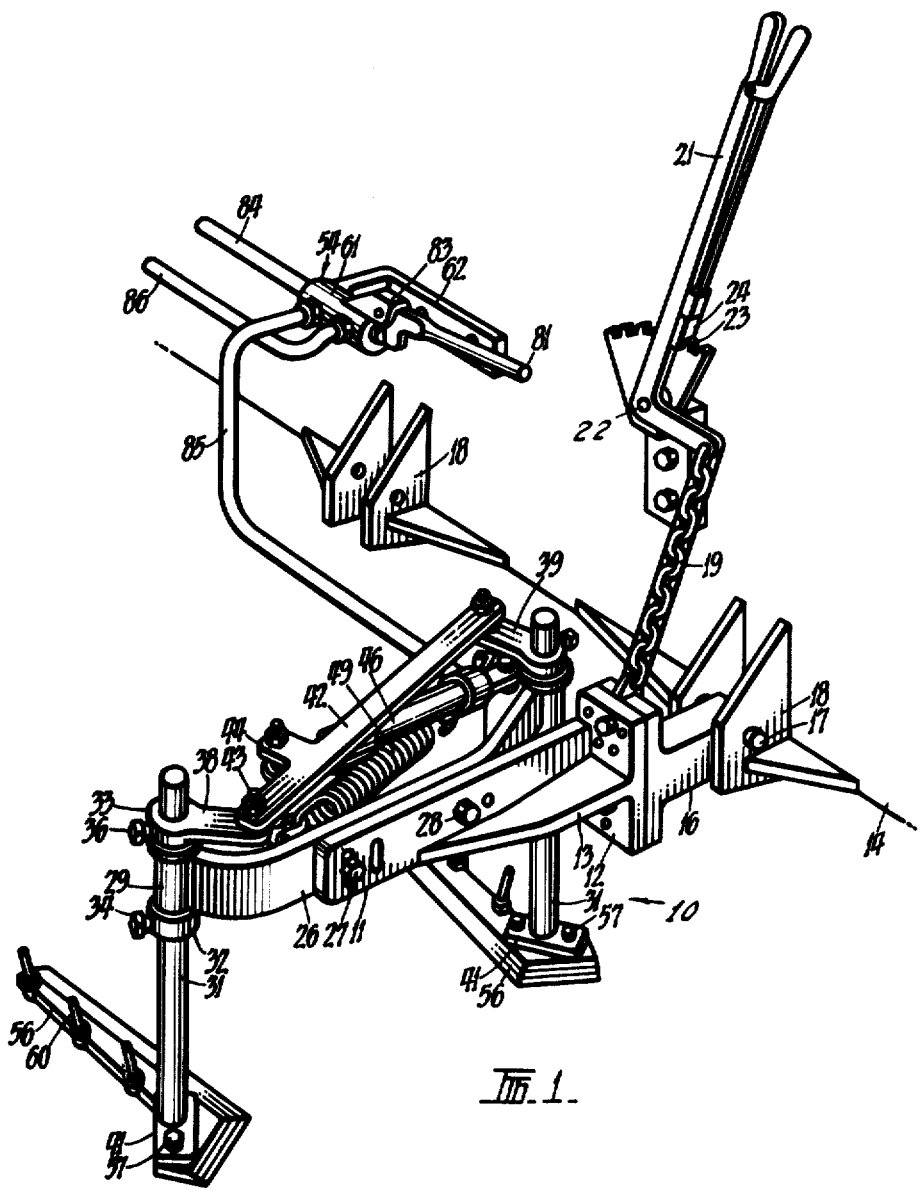
FIG. 1 is a perspective view of an implement constructed and mounted on a tractor in accordance with the present invention.
Figure 5:
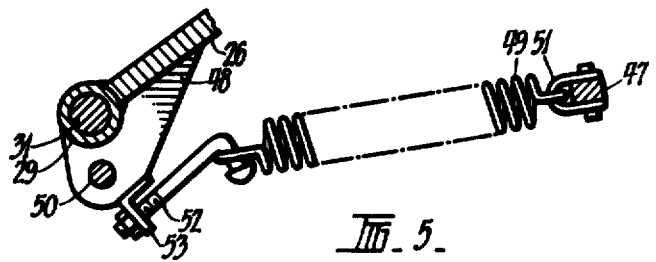
FIG. 5 is a cross section on the line 5—5 in FIG. 4.

The implement shown in FIGS. 1 to 7 is designed for cultivating the soil around vegetables or other small plants planted in rows. This implement, which is denoted generally as 10, comprises a beam 11 which has an end flange 12 and a gusset 13 and is mounted on a tractor 14 so as to extend laterally from the tractor and between the front and rear wheels thereof. The end flange 12 of the beam is bolted to a flange on a mounting arm 16 which is swingable on a forwardly and rearwardly extending pivot pin 17 fitted between mounting the first of two pairs of brackets 18 which are fastened to the tractor. Arm 16 is connected by a chain 19 to the lower end of a cranked lever 21. Lever 21 is pivotally connected to the tractor by a pivot pin 22 such that its upper end is accessible to the tractor operator who may therefore pivot the lever to swing beam 11 about pivot pin 17. Lever 21 is provided with a retractable tongue 24 for engagement with a toothed quadrant plate 23 fixed to the tractor so that the lever may be set in any of a number of positions.

A bar 26 is bolted to the rear face of beam 11 by means of a pair of bolts 27, 28. The ends of bar 26 are bent rearwardly and carry a pair of vertical journal bearing housings 29. A pair of vertical shafts 31 are journaled in these housings so as to be pivotable about a pair of vertical axes spaced laterally of the tractor. Each shaft 31 is located axially with respect to its associated housing 29 by means of a lower collar 32 and an upper collar 33 which are clamped to it by means of grub screws 34 and 36 respectively. A pair of washers 37 are fitted between the upper collars 33 and the bearing housings 29 and the upper collars have crank arms 38, 39 formed integrally with them. Each shaft can be adjusted vertically by altering the positions of its collars 32, 33. The lower ends of shafts 31 are provided with a pair of foot plates 41 to which soil cultivating elements of various types can be fitted as will be described hereinafter.

Crank arm 38 of the collar 33 clamped to the outermost shaft extends forwardly and the crank arm 39 of the collar 33 clamped to the innermost shaft 31 extends rearwardly and the ends of the two crank arms are connected to a connecting link 42 by pivot pins 43. Near to its connection with crank arm 38, connecting link 42 has a rearwardly projecting lug 44 and the outer end of a single-acting hydraulic ram 46 which extends generally longitudinally of beam 11 is pivotally connected to this lug by means of a pivot pin 47. The inner end of ram 46 is connected by means of a pin 50 to a plate 48 fastened to the inner end of bar 26. A helical tension spring 49 is also connected between pin 47 and plate 48 so as to provide a biasing force which opposes the extension of the ram. The spring is connected to pin 47 by means of a shackle link 51 and to plate 48 by means of a hook 52 which is mounted on an angle cleat 53 fastened to the plate.

Hydraulic ram 46 is actuated by means of pressurized oil supplied from the tractor hydraulic system through a sensitive, free flow control valve 54 which will be described in detail hereinafter. When the ram is actuated it moves connecting link 42 so as to force the ends of crank arms 38 and 39 laterally outwardly of the tractor. This causes the two shafts 31 to rotate in mutually opposite senses through equal angular displacements. The outermost shaft 31 rotates in a clockwise direction as viewed from above and the innermost shaft 31 rotates in an anticlockwise direction as viewed from above.

The rotation of the two shafts may be limited by the maximum stroke of ram 46 or by the provision of stops on shafts 31 and cooperating abutments on housings 29. On releasing the ram, helical spring 49 causes the shafts to rotate back to an initial park position.

Figure 2:
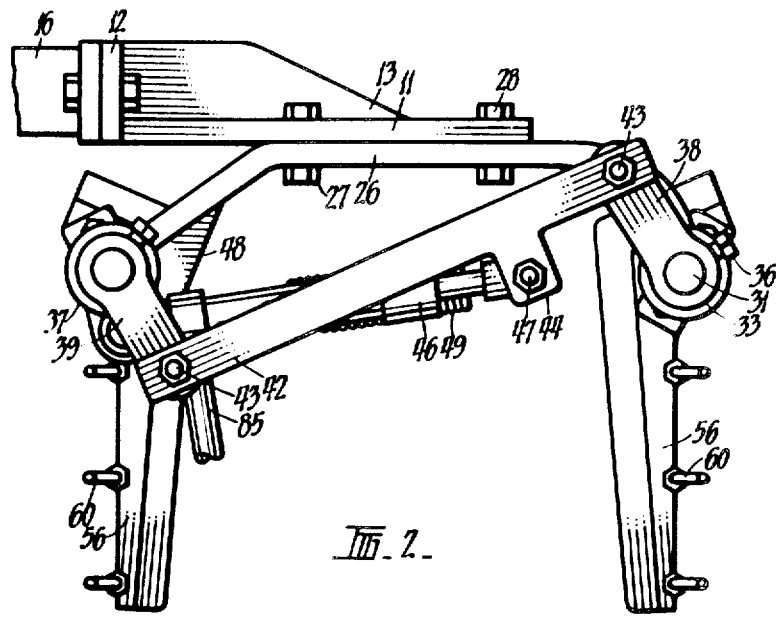
FIG. 2 is a plan of the implement when in a first operating condition.
Figure 3:
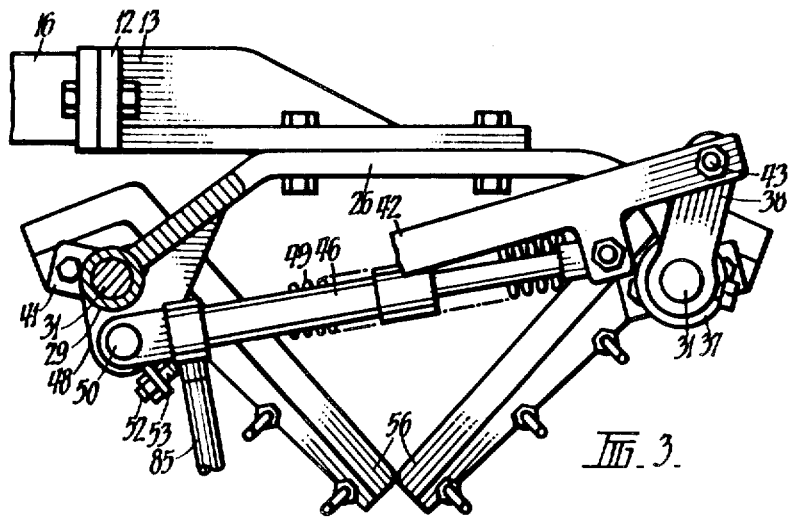
FIG. 3 is a plan of the implement when in a second operating condition.
Figure 4:
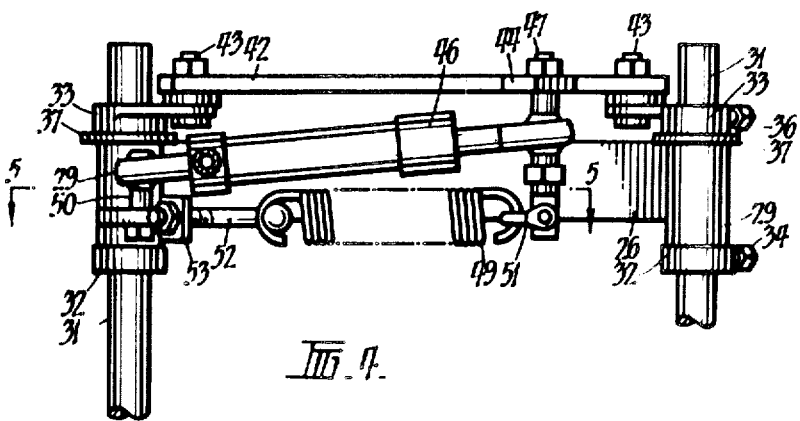
FIG. 4 is a rear elevation of part of the implement when in the condition of FIG. 3.

Depending on the particular cultivating function to be performed, cutting knives, moldboards or disc cutting tools may be fastened to foot plates 41 of shafts 31. The drawings show a pair of cutting knives 56 fastened to foot plates 41 by means of bolts 57. Knives 56 extend in a rearward direction when ram 46 is inoperative, as shown in FIGS. 1 and 2. However, the ram may be operated to cause equal and opposite rotations on shafts 31 so as to swing the rear ends of cutting knives 56 toward one another. The limits of rotation of the shafts are such that the knives may be swung until their rear ends meet, the knives then being disposed in a V-formation with the open mouth of the V facing forwardly as shown in FIG. 3.

The implement fitted with knives 56 may be used to remove weeds from the soil adjacent vegetables in planted rows. The tractor is driven alongside the row of vegetables with shafts 31 disposed one on each side of the row. The operator drives slowly along the row and operates ram 46 so as to cause knives 56 to swing toward and away from one another so as to cultivate the soil around the vegetables in the row without damaging the vegetables. As the knives traverse the soil between the vegetables they are swung into the V-formation as shown in FIG. 3, but when a vegetable is reached they are opened sufficiently to allow them to pass around it.

The construction of valve 52 allows for very sensitive control of the implement. The valve comprises a generally cylindrical body 61 mounted on a bracket 62 which is fastened to the tractor. Body 61 has an internal stepped bore having a relatively small diameter portion 63 and a relatively large diameter portion 64 joined by a conical step 66 and a plunger 67 having a head 70 and a stem 69 is slidable in bore portion 64. The plunger head is fitted with a sealing O-ring 68 and presents a piston face 80 toward bore portion 63. The end of stem 69 has a part spherical recess to serve as a seat for a spherical ball 71. A helical compression spring 72 is disposed around stem portion 69 and ball 71 and extends between step 66 and plunger head 70. This spring serves as a biasing spring for plunger 67 and also as a retaining cage for ball 71. Plunger 67 can be moved by actuation of a cranked lever 81 which is pivotally connected by a pin 82 to a channel-shaped bracket 83 fixed to the top of body 61. A pair of ports 73, 74 extend radially into body 61 to communicate respectively with bore portions 63 and 64. Pipes 84, 85 and 86 are connected by means of screw tappings 75, 76, 77 respectively to the end of bore portion 63, port 73 and port 74. Pipe 84 is connected to the hydraulic system of the tractor to supply oil under the pressure to bore portion 63 and pipe 86 is connected to the oil reservoir of the hydraulic system to return oil back into the system. Pipe 85 is connected to the hydraulic ram. If lever 81 is released, the valve is in the condition shown in FIG. 6. The oil from pipe 84 flows through bore portion 63 into bore portion 64 and out through pipe 86. The oil is then circulating freely and there is not sufficient pressure in pipe 86 to cause actuation of the ram. The pressure of the oil on piston face 80 ensures that plunger 67 remains retracted. If lever arm 81 is swung to move plunger 67 against the action of biasing spring 72 and the oil pressure on piston face 80 to the position shown in FIG. 7, ball 71 is forced against the end of bore portion 63 at the step. The return passage for the oil is thereby cut off and the ram is supplied with pressurized oil through pipe 85 so that it operates to move the knives to the V-formation of FIG. 3. Since the ball is not attached to the plunger it is free to centralize itself in the end of bore portion 63 and ensure a very effective closure of the return oil passage. If the cutting knives encounter a hidden obstruction under the surface of the soil, a pressure pulse passes back through the oil in pipe 85 to cause an impact force on plunger 67. This force is transmitted through lever 81 to the operator's hand. By maintaining a steady force on lever 81, an operator can allow the impact forces exerted on the plunger when an obstruction is met to move the plunger so as to relieve the oil pressure and thereby allow the knives to swing open to clear the obstruction. It has been found that the valve arrangement is so sensitive in action that an operator can actually feel the effect of the knives cutting weeds.

As mentioned above, cultivating elements other than knives may be fitted to the feet of shafts 31. For example, moldboards may be fitted in order to cultivate the soil around vegetables planted in elevated mounds. For other purposes, the shafts could be fitted with disc cutting tools. The depth of the cultivating elements can be varied by operating lever 21 to swing the implement about pivot pin 17.

The above described implement wherein a pair of soil cultivating elements are pivoted concurrently in mutually opposite senses about a pair of upright axis spaced laterally of the tractor presents a novel approach to the problem of weeding between and around vegetables planted in rows. However, the sensitive hydraulic control means of the present invention is not limited in its application to use with an implement of this type. An alternative form of implement the operation of which is greatly enhanced by the control means of the present invention is shown in FIG. 8. This implement, which is denoted generally as 100, is mounted on the tractor in place of the first implement 10. To this end a mounting frame 108 of the implement, consisting of members 109, 111, 112, and 113, is pivotally mounted on pivot pins 107 fitted to the two pairs of brackets 18.

The outer end of member 111 carries a parallelogram linkage or four-bar chain 110 the four links are constituted by a bracket 114, parallel links 115, 116 and a plate 117. Bracket 114 is bolted to member 111 and carries a pair of hinge pin housings 118. Links 115, 116 are pivotally connected to bracket 114 by means of hinge pins 119 which fit into housings 118 and the other two hinge pins 120 fixed to plate 117 and rotatable in bushes 121 fitted to links 115, 116. Plate 117 has two holes drilled in it whereby a bracket 122 carrying, a moldboard 123 is bolted to it by means of bolts 124. The leading edge of moldboard 123 is parallel to plate 117 and the angle which it makes to the direction of travel of the tractor will remain constant even through the parallelogram linkage be swung towards and away from the tractor about pivot pins 119.

The parallelogram linkage is actuated by means of a single acting hydraulic ram 126 the cylinder of which is pivotally connected to a post 127 on member 112 and the piston shaft of which is pivotally connected to link 116. A helical return spring 129 is provided adjacent ram 126 in order continuously to bias the parallelogram linkage towards a retracted position.

Hydraulic ram 126 is connected to the same free flow control valve 54 as was previously used to control the operation of the hydraulic ram of the implement 10. Thus in the present case the pipe 85 from outlet port 73 of the control valve is connected to ram 126, the other connections back to the tractor hydraulic system, remaining the same.

The implement frame 108 is connected to the chain 19 so that the whole implement can be raised and lowered by pivoting movement about pins 107 by actuation of lever 21 thereby to enable the implement to be set in a number of positions so that the depth to which moldboard 123 penetrates the ground may be controlled.

The implement 100 may be used for weeding around large plants and trees. The tractor is driven between the rows of plants or trees and the parallelogram linkage is swung by actuation of the ram so that the mould body is extended and retracted at appropriate times to provide for cultivation around the individual trees or plants. It will be appreciated that the resistance of the soil will bias the moldboard toward its retracted position and the control valve 54 will provide for very sensitive control in that increased soil resistance or impact due to obstacles will cause the transmission of pressure pulses back through the control valve to the control lever 81.

The particular embodiments of the invention which have been described in detail above have been given by way of example only and many modifications and adaptations may be made thereto. For example, the crank arm and connecting link mechanism which is provided in implement 10 in order to cause equal and opposite rotations of the shafts could be replaced by a rack and pinion device. The upper ends of the shafts could be provided with pinions engaging a rack which is reciprocable by the actuation of an hydraulic ram, the arrangement being such that movement of the rack causes equal and opposite rotations of the shafts. The simple lever and chain combination for lifting and lowering the beam could, of course, be replaced by an hydraulic ram. The journal bearing housings in which the shafts are mounted could be adjustably mounted so that the shafts can be set at various angles to the vertical. The feet of the shafts could also be adjustable and the cutting angle of the knives, moldboards or other elements could then be altered by adjustment of the shaft feet or the journal housings, or both. One or both of the journal bearing housings 29 could be adjustable laterally of the tractor so that spacing of shafts 31 could be altered. For some applications, for example the "blocking" of lettuces, it may be desirable to fix one of the knives and pivot the other knife only.

An implement according to the invention need not necessarily be mounted to one side of the tractor but could, for example be mounted underneath the tractor having a high ground clearance. Alternatively, it could be mounted at the back of the tractor.

It is accordingly to be understood that the invention is in no way limited to the particular construction described in detail herein but includes all modifications and adaptations which fall within the scope of the appended claims.

I claim:

1. In combination with a tractor having a hydraulic system serving as a source of hydraulic power fluid, an agricultural implement mounted on the tractor and comprising a soil-cultivating element movable from a retracted or nonworking position to a working position in which the action of soil resistance and obstructions thereon will tend to move it back toward its retracted or nonworking position, an hydraulic ram operable to move the cultivating element to its working position, and control valve means controlling supply of hydraulic fluid from the tractor hydraulic system to said ram, said control valve means comprising a valve body, a valve chamber within the body, an inlet to the chamber through which hydraulic fluid from the tractor system is introduced into the chamber, a first outlet from the chamber through which fluid is supplied from the chamber to the ram, a second outlet from the chamber connected to a return passage of said hydraulic system, and a valve member movable to obstruct flow from the valve via said second outlet, the obstructing movement of the valve member being resisted by pressure of said hydraulic fluid; said chamber being in the form of a stepped bore having a first portion of one diameter and a second portion of a larger diameter and said valve member being constituted by a spherical ball which is deposited within the larger diameter portion of the bore and which is of larger diameter than the smaller diameter bore portion, said valve member further comprising a plunger slidable in the larger diameter bore portion and presenting a piston face toward the smaller diameter portion, and a helical compression spring extending between said piston face and the step between the two bore portions and enclosing said ball, the plunger being slidable so as to move said ball to block the end of the smaller diameter bore portion at the step.

2. The combination claimed in claim 1, wherein the movement of said soil cultivating element between the nonworking and the working positions is pivoting movement about an upright axis.

3. The combination claimed in claim 2, wherein the soil cultivating element is one of a pair of soil-cultivating elements spaced laterally of the tractor and pivotable about a pair of upright axes, of which pair one is the first-said upright axis, and said hydraulic ram is operable to pivot said elements about said axes in mutually opposite senses.

4. The combination claimed in claim 3 wherein the implement comprises a frame, a pair of journal bearing housings on said frame, a pair of upright shafts defining said axes and journaled in said housings, the cultivating elements being mounted on the lower ends of said shafts, a first crank arm projecting forwardly from one of said shafts, a second crank arm projecting rearwardly from the other of said shafts and a link pivotally connected between the two crank arms.

5. The combination claimed in claim 1, wherein said implement comprises a parallelogram linkage, one link of said linkage being substantially prevented from movement laterally of the tractor and the link opposite to said one link carrying said cultivating element and wherein said hydraulic ram is operable to swing the parallelogram linkage about said fixed link so as to cause the soil-cultivating element to be moved toward or away from the tractor between working and retracted positions.